US006555218B2

(12) United States Patent
Halloran et al.

(10) Patent No.: US 6,555,218 B2
(45) Date of Patent: *Apr. 29, 2003

(54) FLAME RETARDANT FILTERS

(75) Inventors: Kristine D. Halloran, St. Paul, MN (US); Cheryl Y. Chase, White Bear Lake, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/867,101

(22) Filed: May 29, 2001

(65) Prior Publication Data

US 2001/0036548 A1 Nov. 1, 2001

Related U.S. Application Data

(60) Division of application No. 09/201,066, filed on Nov. 3, 1998, now Pat. No. 6,239,208, which is a continuation-in-part of application No. 09/003,974, filed on Jan. 7, 1998, now Pat. No. 5,962,129.

(51) Int. Cl.[7] .............................. B32B 7/12; B01D 50/00
(52) U.S. Cl. ................................ 428/355 EN; 428/348; 428/198; 428/920; 428/921; 210/493.1; 210/493.5; 55/497; 55/500; 55/521; 524/487
(58) Field of Search .......................... 428/348, 355 EN, 428/198, 920, 921; 210/493.1, 493.5; 55/497, 500, 521; 524/487

(56) References Cited

U.S. PATENT DOCUMENTS

| 4,169,082 | A |   | 9/1979  | Kusterer |
|-----------|---|---|---------|----------|
| 4,365,980 | A |   | 12/1982 | Culbert et al. |
| 4,439,572 | A |   | 3/1984  | Kindrick |
| 4,575,184 | A |   | 3/1986  | Ueno et al. |
| 4,816,306 | A |   | 3/1989  | Brady et al. |
| 4,833,190 | A |   | 5/1989  | Cella et al. |
| 4,849,135 | A |   | 7/1989  | Reitz |
| 4,885,015 | A |   | 12/1989 | Goulet et al. |
| 4,921,897 | A |   | 5/1990  | Danforth et al. |
| 4,948,669 | A |   | 8/1990  | Rolland |
| 5,059,651 | A |   | 10/1991 | Ueno |
| 5,098,767 | A |   | 3/1992  | Linnersten |
| 5,102,932 | A |   | 4/1992  | Gainer |
| 5,298,544 | A |   | 3/1994  | Goff |
| 5,308,907 | A |   | 5/1994  | Leibowitz et al. |
| 5,317,051 | A |   | 5/1994  | Harashige et al. |
| 5,378,856 | A |   | 1/1995  | Allen |
| 5,482,990 | A |   | 1/1996  | Jow et al. |
| 5,525,757 | A |   | 6/1996  | O'Brien |
| 5,962,129 | A |   | 10/1999 | Halloran et al. |
| 6,239,208 | B1 | * | 5/2001  | Halloran et al. ............ 524/487 |

* cited by examiner

*Primary Examiner*—Daniel Zirker

(57) ABSTRACT

The present invention relates to a flame retardant hot melt composition comprising from about 10% to about 60% by weight of the adhesive of at least one copolymer of ethylene, from about 10% to about 70% by weight of the adhesive of a flame retarding hydrated inorganic compound and from about 5% to about 35% by weight of at least one wax component.

27 Claims, No Drawings

FLAME RETARDANT FILTERS

CROSS-REFERENCE TO RELATED APPLICATION

This application is a division of application U.S. Ser. No. 09/201,066, filed Nov. 30, 1998, now U.S. Pat. No. 6,239,208, which is a Continuation-In-Part of application U.S. Ser. No. 09/003,974, filed Jan. 7, 1998, now U.S. Pat. No. 5,962,129.

FIELD OF THE INVENTION

This invention relates to an ethylene copolymer based flame retardant hot melt adhesive composition.

BACKGROUND OF THE INVENTION

Hot melt compositions find use as adhesives, coatings and sealants. These compositions do not, however, have good flame retarding characteristics in and of themselves, making it necessary to add flame retarding compounds which function under heat to yield compositions which are more difficult to ignite. These compounds act under intense heat and high temperatures by absorbing heat, by decomposing to form a non-flammable ash or coating to provide a barrier against heat transfer or by evolving products such as water vapor which retards or stops further propagation of a fire. Flame retardancy is measured by the oxygen index which is a vertical burning test. An oxygen index of 21 indicates that a composition would burn in atmosphere so the oxygen index is generally required to be 23 or higher to have flame retarding characteristics. The smoke generation of these materials must also be acceptably low before they will be approved for use by the Underwriters' Laboratory (UL).

Both organic and inorganic compounds have been used for flame retardancy. Organic flame retardants include chlorinated paraffins, phosphate esters, chlorinated alicyclic hydrocarbons, fluoropolymers, polyvinyl chloride and a variety of other halogenated organic compounds. Typically these halogenated compounds are used in conjunction with heavy metal oxides, such as antimony oxides, which act as flame suppressants. Currently available adhesive compositions containing thermoplastic halogenated compounds have poor thermal stability resulting in poor color retention and production of noxious fumes. In U.S. Pat. No. 4,169,082 to Kusterer, Jr. issued Sep. 25, 1979, a chlorinated paraffin wax is used as the flame retardant. The elastomer used is an acidic ethylene vinyl acetate based terpolymer. Further included in this composition is a halogen scavenger and a flame suppressant synergist of which the only one disclosed is antimony trioxide, a heavy metal oxide. A halogenated compound in such a blend has been found to produce too much smoke in the compositions of the present invention.

Inorganic flame retardants, which may also be referred to as fillers, include antimony oxide, magnesium hydroxide, zinc borate, barium metaborate, alumina trihydrate, zinc oxide, ammonium octamolybdate and magnesium distearate.

Polymeric based hot melt compositions containing flame retardant materials have been used for many purposes including sealing and jacketing of power cables, insulation and jacketing of electrical conductors and coatings for electrical and optical wires wherein the polymeric composition acts as a layer of insulation. The compositions typically used in these areas have a polymeric material and a filler, as well as other ingredients.

U.S. Pat. No. 4,849,135 to Reitz issued Jul. 18, 1989 teaches a combination of an ethylene copolymer, alumina trihydrate, calcium carbonate or calcium-magnesium carbonate or mixtures thereof and a phosphate ester. The phosphate ester, it is taught, is a necessary ingredient in that it causes the composition to have lower swell on burning and to have smaller and more uniform cell formation in the ceramic ash. Reitz also teaches that it increases flexibility and reduces processing viscosity.

U.S. Pat. No. 4,948,669 to Rolland issued Aug. 14, 1990 teaches a composition consisting essentially of blends or grafts of (a) a polypropylene homopolymer or (b) a non-elastomeric copolymer of propylene and ethylene with an elastomeric ethylene propylene copolymer, 45–65% alumina trihydrate, a coupling agent and an antioxidant. These compositions are used for wire insulation and cable jacketing.

U.S. Pat. Nos. 4,575,184 and 5,059,651 (see below) to Ueno issued Mar. 11, 1986 and Oct. 22, 1991, consecutively U.S. Pat. No. 5,482,990 to Jow et al. issued Jan. 9, 1996 teaches a crosslinked ethylene vinyl acetate copolymer, a coupling agent and an inorganic flame retardant.

U.S. Pat. No. 4,575,184 issued Mar. 11, 1986 and U.S. Pat. No. 5,059,651 issued Oct. 22, 1991 both to Ueno specifically teach a flame retardant and smoke suppressed polymeric composition comprising a radiation cured copolymer of ethylene and vinyl acetate containing 50–85% by weight vinyl acetate and a flame retarding and smoke suppressing amount of a filler mixture. These compositions contain uncrosslinked vinyl acetate polymers which gain strength only upon curing. U.S. Pat. No. 4,575,184 claims an optical communication cable with the composition while U.S. Pat. No. 5,059,651 claims the flame retardant and smoke suppressant polymeric thermoplastic composition. At column 3 lines 37 to 43 it is stated that "a copolymer of ethylene and vinyl acetate containing about 60% by weight of vinyl acetate and having a molecular weight of about 200,000, as admixed with the same weight of a finely divided inorganic filler (aluminum hydroxide), has a tensile strength as low as 0.1 kg/mm$^2$, and is of no practical use." Furthermore, these compositions are very high in viscosity and are intended to be used as sheathing for electrical wire.

U.S. Pat. No. 5,317,051 to Harashige et al. issued May 31, 1994 teaches a flame-retardant olefin polymer composition superior in surface whitening prevention having a blend of a resin component consisting principally of an olefin resin and an olefin polymer modified with an unsaturated carboxylic acid or derivative thereof, a flame retardant and a whitening preventing agent. All of the compositions exemplified contain a maleic acid-modified ethylene-butene copolymer. Harashige teaches that these compositions are useful for electric wires, cables, packages, sealing materials, hoses, films, molded products and master batches.

U.S. Pat. No. 5,525,757 to O'Brien issued Jun. 11, 1996 teaches a flame retardant composition for use in a plenum cable wherein the composition comprises a polyolefin blend of polypropylene, a very low density polyethylene, a polyethylene, and a mixture of flame retarding chemicals comprising a chlorinated flame retardant and a non-halogen flame retardant. The major component of the polyolefin blend is the polypropylene resin at 50 to 85 parts by weight per hundred parts by weight of the polyolefin blend used.

In addition to the above applications, flame retardant compositions are useful in the air filter industry, and in particular are useful for High Efficiency Particulate Air (HEPA) Filters. In this situation, the compositions act as adhesives to adhere the pleats of the filters together. These adhesives are extruded onto the filters and each filter pleat is adhered to the next. The difficulty in using the polymeric compositions described above is that the viscosities of these compositions are too high for use in hot melt application equipment. In order to lower the viscosity of a hot melt adhesive, it is common to replace part of the polymer with lower molecular weight materials such as resin and wax. However, when commonly used proportions of these materials are used, the smoke generation upon burning is unacceptably high. In addition, lowering the polymer content to decrease viscosity can result in decreased filler acceptability and decreased flexibility of the resultant composition.

HEPA filters utilizing a hot melt adhesive as a filter pleating adhesive are discussed in U.S. Pat. No. 4,365,980 to Culbert et al. issued Dec. 28, 1982. Culbert discusses utilizing a hot melt adhesive, "Instant Lok," supplied by National Adhesives, Inc. This hot melt is ethylene vinyl acetate based and is generally used for case and carton sealing. It has greater than 25% tackifying resin, has no flame retardant and is therefore not a flame retardant adhesive. See column 3 lines 63 to 68.

It is an object of the present invention to provide a novel polymeric based flame retardant composition which has a relatively low viscosity, is flexible in a thin bead or film and adheres well to a variety of porous substrates while maintaining a high oxygen index and low smoke generation.

SUMMARY OF THE INVENTION

The present invention relates to a flame retardant hot melt composition comprising from about 10% to about 60% by weight of the adhesive of at least one copolymer of ethylene, from about 10% to about 70% by weight of the adhesive of a hydrated inorganic compound and from about 5% to about 35% by weight of at least one wax component.

The composition may further comprise up to about 10% by weight of the adhesive of a tackifying resin.

The present invention further relates to a flame retardant hot melt composition consisting essentially of from about 10% to about 60% by weight of the adhesive of at least one copolymer of ethylene, from about 10% to about 70% by weight of the adhesive of a hydrated inorganic compound and from about 5% to about 35% by weight of at least one wax component.

The resultant composition is characterized as having an oxygen index of greater than about 23, preferably greater than about 25, more preferably greater than about 40 and most preferably greater than about 50 and a smoke number preferably less than about 6, more preferably less than about 5 and most preferably less than about 3.

The resultant composition is further characterized as having a viscosity of less than about 30,000 cPs at about 135° C., preferably less than about 25,000 cPs and most preferably less than about 20,000 cPs and Young's Modulus from about 1500 kg/cm$^2$ to about 10,500 kg/cm$^2$ and preferably from about 2500 kg/cm$^2$ to about 6000 kg/cm$^2$.

The compositions are useful where flame retardancy is a requirement, specifically in the air filter industry and in particular for High Efficiency Particulate Air (HEPA) filters.

The present invention further relates to a High Efficiency Particulate Air Filter comprising a material effective for filtering airborne contaminants and an adhesive applied to the material wherein the adhesive comprises from about 10% to about 60% by weight of the adhesive of at least one copolymer of ethylene, from about 10% to about 70% by weight of the adhesive of a hydrated inorganic flame retarding compound and from about 5% to about 35% by weight of at least one wax component.

The filter may be pleated prior to or after application of the adhesive to the filter media or filter material.

DETAILED DESCRIPTION OF THE PREFERRED EMBODIMENTS

The copolymers of ethylene useful to the present invention include ethylene n-butyl acrylates, ethylene methyl (meth) acrylates, ethylene ethylacrylates and interpolymers of ethylene with at least one $C_3$ to $C_{20}$ α-olefin. Ethylene n-butyl acrylate copolymers are available from such companies as Elf Atochem North America in Philadelphia, Pa. under the tradename of Lotryl®, from Exxon Chemical Co. in Houston, Tex. under the tradename of Escorene®, from Du Pont de Nemours & Co. in Wilmington, Del. under the tradename of Elvaloy® and from Millennium Petrochemicals in Rolling Meadows, Ill. under the tradename of Enathene®. Ethylene methyl acrylate copolymers are available from Exxon Chemical Co. under the tradename of Optema®. Ethylene vinyl acetate copolymers are available from Du Pont under the tradename of Elvax® and from Millennium Petrochemicals under the tradename of Ultrathene® to name only a couple. The term "copolymer" in the present sense is simply meant to refer to copolymerization of ethylene and also encompasses the use of terpolymers.

The interpolymers (copolymers, terpolymers, etc.) of ethylene with at least one $C_3$ to $C_{20}$ α-olefin are homogeneous linear or substantially linear polymers further characterized in that each interpolymer has a polydispersity of less than about 2.5. These polymers are available from Exxon Chemical Co. under the tradename of Exact®, which are ethylene-butene copolymers and under the tradename of Exxpol® which are ethylene-propylene copolymers. Ethylene/1-Octene copolymers are available from Dow Chemical Co. in Midland, Mich. under the tradenames of Affinity®, Insite® and Engage®, The interpolymers preferably have a density from about 0.85 to about 0.915, more preferably from about 0.85 to about 0.89, even more preferably from about 0.85 to about 0.88 and most preferably from about 0.85 to about 0.875. The density of the resultant polymer is a reflection of the amount of comonomer utilized with the polyethylene. The more comonomer typically the lower the density. Some comonomers, such as butene, produce lower densities in general than other comonomers such as octene. Comonomers include styrene, 1-butene, octene, 1-hexene, propene, isobutylene, 4-methyl-1-pentene and so forth.

The polymers preferable for use in the present invention preferably have a melt index greater than about 400 g/10 minutes as measured by ASTM D 1238 and more preferably greater than about 800 g/10 min. The testing conditions used are commonly 190° C. with a 2.16 kg weight. Testing conditions are generally specified by the manufacturers of the polymers and are determined by such things as the molecular weight and melting point of the polymer. Commercially available ethylene copolymers generally have melt indices of no greater than about 5000 g/10 minutes. Ethylene copolymers having higher copolymer contents, such as greater than about 25% copolymer by weight, generally have melt indices of less than about 3000 g/10 minutes and more commonly less than about 2500 g/10 min. The copolymer content is preferably from about 25% to about 45% by weight of the polymer and preferably from about 25% to about 35% by weight of the polymer. Increasing the amount of the copolymer to greater than about 45% by weight results in a polymer that is very soft, lacks sufficient tensile strength and may remain tacky at room temperature. It is surmised that the polarity of these compounds help to better disperse and retain the inorganic fillers.

Having copolymer contents ranging from about 25% to about 45% by weight helps increase desired flexibility in the final composition. In a preferred embodiment, an ethylene vinyl acetate copolymer having a vinyl acetate content of about 28% by weight of the polymer and melt index of about 400 g/10 minutes is utilized. In another preferred embodiment, a blend of ethylene vinyl acetate copolymers having a vinyl acetate content of about 28% and having melt indices of 800 and 2500 g/10 min. is used. These thermoplastic polymers are useful from about 10% to about 60% by weight of the composition, preferably from about 10% to about 50% by weight and most preferably from about 10% to about 40% by weight of the composition.

The current inventors envision that other polymers could be used in combination with the copolymers of the present invention provided that the desirable characteristics of the final hot melt composition are not altered.

The flame or fire retardant compounds useful to the present invention include hydrated inorganic compounds, or metal hydrates, which function by absorbing heat, evolving water vapor or steam which dilutes combustible gases being generated, producing a nonflammable char barrier between the heat source and the material and also functions as a smoke suppressant.

Examples of useful flame retardants, also properly referred to as fillers, include alumina trihydrate, magnesium hydroxide, hydrated calcium silicates, hydrated calcium carbonates and basic magnesium carbonates.

Sources of alumina trihydrate flame retardants include Akron Chemical Co. in Akron, Ohio, Aluchem Inc. in Ohio, CSA Chemical in New Jersey, Fiberchem Inc. in Washington, GCA Chemical Corp. in Connecticut, Great Lakes Minerals Co., Specialty Products Division in Michigan, Harwick Chemical Corp. in Ohio, R. J. Marshall Co. in Michigan, New England Resins & Pigments Corp. in Massachusetts, Smith Chemical & Color Co. in New York, Summit Chemical Co. in Ohio and Westport Industries Inc. in Missouri. Sources of magnesium hydroxide ($Mg(OH)_2$) include the Polymer Additives Group, a Division of R. J. Marshall Co. in Southfield, Mich. and J. M. Huber Corp. in Norcross, Ga. While the selection of a flame retardant filler is vast, the alumina trihydrate and the magnesium hydroxide are preferably used in the present invention. Alumina trihydrate, which has a greater degree of hydration, is most preferable to the present invention. These flame retardants are useful from about 10% to about 70% by weight of the composition, preferably from about 20% to about 70% by weight and most preferably from about 30% to about 70% by weight of the composition.

A zinc borate flame retardant filler may optionally be used in the present invention. The zinc borate is known to act well as a smoke suppressant and is usually used in combination with antimony oxide for flame retardance in PVC, polyolefins, unsaturated polyesters, thermoplastic polyesters, epoxies, nylons, urethane and phenolics. See, for instance, U.S. Pat. No. 4,439,572 to Kindrick issued Mar. 27, 1984; U.S. Pat. No. 4,833,190 to Cella et al. issued May 23, 1989; U.S. Pat. No. 4,921,897 to Danforth et al. issued May 1, 1990 and U.S. Pat. No. 5,298,544 to Goff issued Mar. 29, 1994. U.S. Pat. No. 5,059,651 to Ueno issued Oct. 22, 1991 uses zinc borate in combination with hydroxides or carbonates of di- and tri-valent metals. These optional fillers are useful up to about 40% by weight of the composition, preferably from about 10% to about 20% by weight and most preferably from about 1% to about 10% by weight of the composition. The present inventors have found that while the zinc borate is useful to reducing smoke generation, it is not a necessary component. Alternatives to zinc borate may include barium borate, ammonium fluoroborate, barium metaborate, zinc stearate, ammonium octamolybdate and zinc stannate to mention only a few.

One example of a zinc borate filler useful herein has the formula, $2ZnO.3B_2O_3.3.5H_2O$, or in other words, 45% ZnO, 34% $B_2O_3$ and 20% water The $H_2O$ content is between about 3.3 to 3.7 and the hydrated form is desired, although nonhydrated forms are available. The particle size is usually 2–10 microns and the refractive index about 1.58. This composition may be found under the tradename of Firebrake® ZB manufactured by U.S. Borax in Valencia, Calif. and marketed by Harwick in Akron, Ohio.

Any of these hydrated fillers can be surface treated with a saturated or unsaturated carboxylic acid having about 8 to about 24 carbon atoms and preferably about 12 to about 18 carbon atoms or a metal salt thereof. Mixtures of these acids and/or salts can be used, if desired. Examples of suitable carboxylic acids are oleic, stearic, palmitic, isostearic and lauric. Examples of metals which can be used to form the salts of these acids are zinc, aluminum, calcium, magnesium and barium. Examples of the resultant salts include magnesium stearate, zinc oleate, calcium palmitate, magnesium oleate and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303. The acid or salt can be merely added to the composition in like amounts rather than using the surface treatment procedure. The surface treatment, while allowing the compounds to more readily mix and disperse with polymers, is not necessary and generally adds more cost to the resultant filler, therefore making it more undesirable where cost is an issue.

The present invention may further comprise a halogenated compound which also acts as a flame retardant. If a halogenated wax is utilized, this may also act as all or part of the wax component. In a preferred embodiment of the present invention a halogenated wax is utilized, and in particular a chlorinated paraffin wax is utilized. A synthetic high melting point wax may be utilized in combination with the chlorinated wax. The high melting point wax lowers the viscosity of the resultant composition making it easier for processing and application. In a preferred embodiment of the present invention, the chlorinated components, alone or in combination with another wax component, are useful up to about 35% by weight of the composition and preferably from about 10% to about 25% of the composition and most preferably from about 15% to about 25% by weight of the composition. Chlorinated paraffin waxes are available under the tradename of Chlorez® available from Dover Chemical Corp. in Dover, Ohio.

It has been found in a more preferred embodiment of the present invention, that alumina trihydrate flame retardant is preferably used in combination with a chlorinated paraffin wax. These compositions exhibit little burning whatsoever upon exposure to flame. The compositions in this instance preferably comprise from about 30% to about 70% alumina trihydrate by weight of the composition and from about 10% to about 35% chlorinated paraffin by weight of the composition and more preferably from about 10% to about 25% by weight of the chlorinated paraffin. Even more preferable to the present invention is when a synthetic high melting point wax is utilized in combination with the above two ingredients in order to lower the molten viscosity of the resultant composition.

The compositions having chlorinated paraffin are highly flame retardant. However, there are darker in color and have less thermal stability and are higher in viscosity than those compositions without the halogenated compound.

The other waxes useful herein are those classified as high melting point waxes. These waxes typically have melting points greater than about 80° C. and preferably greater than about 90° C., even more preferably greater than about 95° C. and most preferably greater than about 100° C. The waxes generally have melting points no higher than about 120° C. and more typically are less than about 115° C. Useful waxes include synthetic high melting point waxes and high melting point microcrystalline waxes. Synthetic high melting point waxes include high density, low molecular weight polyethylene waxes, by-product polyethylene waxes and Fischer-Tropsch waxes. By-product polyethylene simply refers to the fact that the product is a by-product of a process which is used to obtain another chemical. For instance, waxes may be produced as a by-product of petroleum cracking process. These by-product waxes are also high density, low molecular weight polyethylene. Preferred waxes include Petrolite® C4040, Polywax® 1000, 2000 and 3000, low molecular weight polyethylene waxes available from Petrolite Corp.; Escomer® H-101. a modified polyethylene wax available from Exxon Chemical Co. in Houston, Tex.; Marcus® 100, 200 and 300, low molecular weight polyethylene waxes available from Marcus Chemical Co., a Division of H.R.D. Corp. located in Houston, Tex.; and Paraflint® H-1, H-4, and H-8, Fischer-Tropsch waxes available from Sasol-SA/Moore & Munger in Shelton, Conn.

The microcrystalline waxes useful herein are those having about 50% by weight or more cyclo or branched alkanes with a length of between about 30 and 100 carbons. They are generally less crystalline than the high melting point polyethylene waxes, and have melt points of greater than about 75° C. and even more preferably greater than about 80° C. and most preferably greater than about 90° C. Examples of these waxes include Be Square® 175 Amber Wax, an 80° C. melt point microcrystalline wax, Be Square® 185 Amber Wax, an 85° C. melt point microcrystalline wax, and Be Square® 195 Amber Wax, a 90° C. melt point wax all available from Petrolite Corp. and Petrowax® 9508 Light, a 90° C. melt point wax available from Petrowax Pa., Inc. located in New York, N.Y.

In some preferred embodiments, synthetic high melting point waxes are used. Although the microcrystalline waxes are also very useful, the viscosity of the finished product is generally higher with the microcrystalline waxes.

The total wax component is useful from about 5% to about 35% by weight of the composition and preferably from about 10% to about 30% by weight and more preferably from about 15% to about 25% by weight of the composition.

Other waxes may be used in combination with the high melting point waxes. These include paraffin waxes and lower melting point microcrystalline waxes. The paraffin waxes useful herein are those having a Ring and Ball softening point of about 50° C. to about 80° C. Useful examples include Okerin® 236TP available from Astor Wax Corporation located in Doraville, Ga., Penreco® 4913 available from Pennzoil Products Co. in Houston, Tex., R-7152 Paraffin Wax available from Moore & Munger in Shelton, Conn., and Paraffin Wax 1297 available from International Waxes, Ltd in Ontario, Canada. Examples of useful microcrystalline waxes include Victory(® Amber Wax, a 70° C. melt point wax available from Petrolite Corp. located in Tulsa, Okla.; Bareco® ES-796 Amber Wax, a 70° C. melt point wax available from Bareco in Chicago, Ill. and Okerin® 177, an 80° C melt point wax available from Astor Wax Corp. These waxes are useful up to about 20% by weight of the composition and preferably up to about 10% by weight of the composition.

A wax may be useful to the present invention to lower the viscosity without increasing smoke generation. It has been found that utilizing high amounts of tackifying resins to reduce viscosity tends to also increase the smoke generation. The high melting point waxes are preferred to improve heat resistance as measured by peel and shear values.

The tackifying resins useful herein include aliphatic, cycloaliphatic and aromatic hydrocarbon resins and modified hydrocarbons; terpenes and modified terpenes; rosins and modified rosins, including rosin esters, and mixtures thereof. One skilled in the art would know that these resins are all available with different levels of saturation or hydrogenation. This is often measured by the bromine number. For instance, the Eastotac® series of cycloaliphatic hydrocarbon resins from Eastman Chemical Co. in Kingsport, Tenn. are available in the E, R, L and W grades. The E series typically has a bromine number of about 15, while the R, L and W series have bromine numbers of about 5. These resins are also available with different softening points of 100° C., 115° C. and 130° C. Eastotac® H-142R is also available with a bromine number of about 5 and a softening point of about 140° C. Other useful resins include Escorez® 5300 and Escorez® 5400, partially hydrogenated cycloaliphatic petroleum hydrocarbon resins, and Escorez® 5600, a partially hydrogenated aromatic modified petroleum hydrocarbon resin all having softening points of about 100° C. and available from Exxon Chemical Company in Houston, Tex.; Wingtack® Extra which is an aliphatic, aromatic petroleum hydrocarbon resin, Wingtack® 86, an aromatic modified synthetic polyterpene hydrocarbon resin and Wingtack® 95, a synthetic polyterpene all having softening points of less than about 100° C. and available from Goodyear Tire and Rubber Co. in Akron, Ohio and Arkon® P-70, P-90 and P-100, synthetic petroleum hydrocarbon resins having softening points of 70° C., 90° C. and 100° C. consecutively and available from Arakawa Chemical (USA) Inc. in Chicago, Ill. Further examples include Hercolite® 2100 which is a partially hydrogenated cycloaliphatic petroleum hydrocarbon resin available from Hercules, Inc. in Wilmington, Del. and Zonatac® 105 Lite which is a styrenated terpene hydrocarbon resin, made from d-limonene and available from Arizona Chemical in Panama City, Fla. Useful modified rosins include Sylvatac(® 1103 and Zonester® 100 available from Arizona Chemical and Permalyn 305 available from Hercules which are all pentaerythritol rosin esters. All of these resins also have softening points of less than about 100° C. Sylvatac(® 1085, an 85° C. softening point glycerol rosin ester of tall oil is another example of a useful rosin based tackifier. It should be noted that there are numerous types of rosins and modified rosins with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins.

Examples of useful pure alphamethyl styrene resins are Kristalex® 3070 (70° C. softening point), 3085 (85° C. softening point) and 3100 (100° C. softening point) available from Hercules in Wilmington, Del.

It has been found that a small amount of tackifying resin helps to lower the viscosity, to improve adhesion characteristics and to improve flexibility as measured by Young's Modulus. The lower the Young's Modulus, the more flexible the adhesive. Too much resin results in unacceptable smoke generation. The tackifying resins are useful from 0% to about 10% by weight of the composition, preferably from about 1% to about 10% by weight, more preferably from about 3% to about 7% by weight and most preferably from about 3% to about 5% by weight of the composition.

The tackifing resins found to be preferable to the present invention are those resins which are low in aromatic content and high in saturation, or in other words, are highly hydrogenated having few double bonds. Preferably, these resins are hydrocarbon resin. Some preferred resins include the Eastotac® series of hydrocarbon resins and Escorez® 5300 and 5400 which are hydrogenated cycloaliphatic hydrocarbon resins. It is surmised that these types of resins produce less smoke generation than other types of tackifying resins. In a preferred embodiment of the present invention, 3% by weight of a hydrocarbon tackifying resin is used.

A liquid component or plasticizer may optionally be used in the compositions of the present invention. The most relevant plasticizers are liquid elastomers including polybutenes and polyisobutylenes. These liquid components reduce viscosity and increase flexibility. Examples of useful plasticizers include Parapol® 1300, a liquid polybutene available from Exxon Chemical Co. in Houston, Tex. and Indopol® H-50, H-100 and H-300, liquid butene homopolymers available from Amoco Corp. in Chicago, Ill. It is desirable that these liquid components do not increase the tack of the finished composition. They are useful in amounts up to about 10% by weight of the composition.

A stabilizer or antioxidant is also preferably used in hot melt adhesives. These compounds are added to protect the adhesive from degradation caused by reaction with oxygen induced by such things as heat, light or residual catalyst from the raw materials such as the tackifying resin. Such antioxidants are commercially available from Ciba-Geigy in Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite antioxidants are considered to be secondary antioxidants and are generally not used alone. These are primarily used as peroxide decomposers. Other available antioxidants are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties.

Other compounds that could be added that also do not affect physical properties are pigments which add color, fluorescing agents, UV absorbers and odor masks. Of particular importance to the adhesives of the present invention are pigments including titanium dioxide which adds whiteness to a product. This can be important to the aesthetics of a finished article. Additives like these are generally added in small amounts of less than 5% by weight of the composition, more typically even less than about 2% by weight of the composition and are known to those skilled in the art.

These compositions are characterized as having an oxygen index of greater than about 23 (atmosphere is 21 and is unacceptable for flame retardance), preferably greater than about 25, more preferably greater than about 40 and most preferably greater than about 50 as measured by Test Method No. 1 for Oxygen Index included in this specification. Applicants have found that the highest oxygen index numbers may be achieved by utilizing a combination of a halogenated compound, preferably a wax, and alumina trihydrate flame retardant.

The compositions having chlorinated paraffin have been found to have a higher oxygen index and may be useful for deep Class 2 filters and Class 1 filters. In contrast, the composition utilizing only hydrated inorganic flame retardants may be more useful for Class 2 shallow and medium filters.

They are further characterized as having a smoke number of preferably less than about 6 as measured by Test Method No. 2 included in this specification, more preferably less than about 5 and most preferably less than about 3. It should be noted that this is a qualitative and subjective test which may vary from operator to operator. It is also a relative rating of the examples tested.

They are further characterized as being flexible having a Young's Modulus, as measured by the Tensile and Elongation test found in the Examples Section of the Specification, from about 1500 kg/cm$^2$ to about 10,500 kg/cm$^2$ and preferably from about 2500 kg/cm$^2$ to about 6000 kg/cm$^2$.

The compositions of the present invention are light in color having a yellowness index (also b value or yellow-blue index) of less than 5 and preferably from about 1 to about 3 as measured using a Minolta Chromameter, Model No. CR-331 and an L value or black-white index, another important indicator of whiteness of less than 100, preferably from about 75 to about 100 and most preferably from about 90 to about 100.

The viscosities are preferably less than about 30,000 cPs at about 150° C., preferably less than about 25,000 cPs and more preferably less than about 20,000 cPs at 150° C., although the acceptable viscosity will depend on the temperature of application and the equipment used to apply the composition. The temperature of application of a composition containing alumina trihydrate is typically about 135° C. to about 150° C., but may even be 120° C. or less but is generally never higher than about 150° C. because the aluminum trihydrate can begin to release water of hydration at such temperatures. The temperature of application for magnesium hydroxide may be higher. The application temperature is therefore dependent on temperature at which the flame retardant is activated. The viscosity is limited by the application equipment.

The Mettler Ring and Ball Softening points are generally greater than about 90° C. and even more typically greater than about 100° C. and even greater than about 105° C.

The peel values are greater than about 40° C., preferably greater than about 45° C., more preferably greater than about 50° C. and most preferably greater than about 55° C. Peel values are an indication of the heat resistance that a hot melt adhesive may have, or in other words, may be a measure of the temperature at which an adhesive bond may fail. This is important for shipping and storage when the products may be exposed to higher ambient temperatures. It is important to note that this is not an absolute number, but rather gives an indication, relative to other hot melt adhesives, as to which hot melts have better heat resistance than others.

These compositions are useful in applications where flame retarding characteristics are desired and may be used in the filter industry, for pipe wrapping, as flexible heat duct sealants and for potting and encapsulation of electrical components. Of course, the physical requirements for the compositions will be different depending on the application in which they are used.

These compositions are particularly useful as adhesives for air filters generally and specifically they are very useful for High Efficiency Particulate Air (HEPA) filters. These filters remove airborne contaminants and are used in highly technical manufacturing such as in the medical, chemical, food processing, space, nuclear, semiconductor and computer industries.

HEPA filters are generally pleated to increase filter surface area. This may be accomplished by folding a continuous strip of material back and forth resulting in an accordion-like shape. It is necessary to keep the pleats of the filter separated or spaced apart in a permanent and secure manner for however long the filter may be used which may be accomplished with various types of spacers including adhesives.

The adhesive is generally applied to the material of the filter material or filter media when the filter material is still in a continuous strip and has not yet been folded or pleated, or in other words, prior to folding or pleating the filter material into the accordion-like shape. However, the adhesive may also be applied after pleating. The filter material may also be referred to as the filter media, and for filters requiring flame retardancy, is generally made of a fiber glass composite material.

The adhesive may be applied in a continuous bead or it may be in a discontinuous (intermittent or interrupted) or stitch pattern. In the former case, the filter is pleated after the adhesive is applied but while the adhesive has not yet set and is still warm and ductile. In the latter case, the adhesive is laid down in a pattern such that the adhesive is between the pleats and invisible when looking at the outside of the filter. These filters have a honeycomb type appearance when they are in the final form.

These filters come with differing numbers of pleats and the pleats may have different depths from filter to filter depending on air flow requirements and the performance required of a particular filter. The process of using the adhesive to bond the pleats, therefore supporting and separating them, is also referred to as pleat separation or filter pleating. Different types of HEPA filters are discussed in U.S. Pat. No. 4,365,980 to Culbert et al. issued Dec. 28, 1982, U.S. Pat. No. 4,885,015 to Goulet et al. issued Dec. 5, 1989 and in U.S. Pat. No. 5,098,767 to Linnerston issued Mar. 24, 1992.

The filters are required to pass an Underwriters' Laboratory test, UL 900 TEST PERFORMANCE OF AIR FILTER UNITS. There are two classes of air filters: Class 1 and Class 2. A Class 1 air filter unit shall not produce flame or sparks when subjected to the flame-exposure and spot-flame tests, and during the flame-exposure test shall not cause the development of an area of more than 16.1 $cm^2$ as measured below the smoke density time curve.

Class 2 air filter units shall not produce flame or extensive (25 or more) sparks which are sustained beyond the discharge end of the test duct when subjected to the flame-exposure test and shall not cause the development of an area of more than 58 $cm^2$ as measured below the smoke-density time curve.

An adhesive material used for coating the filtering medium or other part of an air filter unit shall have a flash point of not less than 163° C. as determined by the Test Method for Flash and Fire Points by Cleveland Open Cup, ASTM D92-78.

These test methods are available from UL (UL 900).

It is desired that the compositions of the present invention pass Class 2 air filter unit testing. It is also possible to use the compositions on Class 1 air filters if the amount of adhesive used is decreased.

The following non-limiting examples further illustrate the invention.

Examples 1–14 and Comparative Example A

The adhesives were prepared using a high shear sigma blade mixer such as those manufactured by J. H. Day in Cincinnati, Ohio. The temperature of these mixers is maintained between about 135° C. and about 150° C. The ethylene copolymers are first added to the mixer followed by the flame retardant fillers. The resultant blend is mixed until smooth and homogeneous. The resin, wax and any liquid component are then slowly added to the mixture to prevent phase separation. Any antioxidant used may be added at any point during preparation including at the beginning, or split and added at different stages during mixing. The pigment may be added at the end or also at any other point if one so chooses. This process may be altered depending on the choice and amounts of the ingredients used of which one of skill in the art would understand.

Test Methods

1. Oxygen Index

This test conforms with ASTM D 2863-74 Test for Flammability of Plastics Using the Oxygen Index Method (type D materials). The procedure is used to determine the relative flammability of cast films of coatings, adhesives and sealants using the G.E. Oxygen Index apparatus for measuring the minimum concentration of oxygen in a flowing mixture of oxygen and nitrogen that will just support flaming combustion.

2. Smoke Generation (Smoke Number)

The Smoke Number is obtained using the same Oxygen Index apparatus as in Test Method 1 above. A 3040 mil film was burned in a 30% oxygen environment for 1.5 minutes. The smoke generated is then visually observed and was rated on a basis relative to other samples tested. The samples were then ranked on a scale of 0–10 with 0 being no smoke generation and 10 being dense smoke. This is a qualitative and subjective test and it should be understood that this may vary slightly from user to user. The present inventors have rated the examples on a relative scale.

3. Melt Viscosity

The melt viscosities of the hot melt adhesives were determined on a Brookfield Thermosel Viscometer Model RVDVII+ using a number 29BS (solid shaft) spindle. The speed is generally about 50 rpms but the speed, as well as the spindle size, may be varied depending on the viscosity.

4. Color

A Minolta Chromameter CR-331 (Colorimeter) was used to measure color. A sample of adhesive was heated in an oven until just molten and is then poured onto release paper making sure that the sample, once cool and set, has no air bubbles. Three values are measured by the instrument: L is the value obtained for lightness, a is the red-green index and b is the yellow-blue index. The L value ranges from 0 (black) to 100 (white), a ranges from +red to –green and b ranges from +yellow to –blue. In this case, the L value and the b value are of importance in determining the whiteness of the sample. For the b value, the more negative the whiter the product or the more positive the yellower the product.

5. Tensile and Elongation, Young's Modulus

Young's Modulus was determined using ASTM D-638. The die used is an ASTM D-638 Type IV die. A one inch gauge with a video extensometer is used to monitor elongation. The strain rate used is 5.08 cm/minute. Young's Modulus is a method 5 of ranking the relative flexibility of adhesive films. The film thickness used is 20 –30 mils. The resistance to tensile deformation is measured at small strains. All samples were tested at about 23° C. (room temperature).

6. Programmed Oven Peels and Shears

Peel and/or shear values were determined by placing samples in a programmed oven with 100 g weights for the peel mode and 500 g weights for the shear mode, and ramping the temperature up from about 25° C. to 125° C. at 25° C./hour. The oven automatically recorded the temperature at which the samples failed. Each sample was coated onto kraft paper by hand using glass rods or shims. A top sheet of kraft paper is rolled down onto the bottom sheet of kraft paper onto which the hot melt is poured. The rods are then used to roll the adhesive down as well as for mating the top sheet of kraft to the bottom sheet. Release paper is used on either side of a 2.54 cm strip on the bottom sheet of kraft paper. The resultant coating is then a one inch (2.54 cm) wide band that is about 8–10 mils or about 0.02 cm to about 0.03 cm thick. Four to five bonds were made for the peel mode and four to five bonds were made for the shear mode and the results were averaged.

7. Mettler Ring and Ball Softening Point
ASTM Method D-3461.

Example 3 illustrates a medium range composition for ingredients but has less tackifying resin than Example 2 and also has less smoke generation.

Example 4 has the same ingredients as Example 3 but has only a hydrated inorganic flame retardant. A higher oxygen index and a slightly higher smoke number were obtained.

Example 5 illustrates a composition using a maximum amount of flame retardant and no tackifying resin. The flame retardant characteristics are not improved in this instance. The Parapol® 1300 liquid polybutene is used to improve flexibility in this case.

Example 6 illustrates the maximum amount of ethylene vinyl acetate which may be employed while still retaining an acceptable viscosity profile for the finished product, and also represents a sample having a minimum amount of hydrated inorganic flame retardant. The oxygen index is at the lower end of what is acceptable and the viscosity is on the higher end, although this product is still within an acceptable range to the present invention.

Example 7 illustrates the maximum amount of resin desirable and the smoke number is greater than what would be preferred in the present invention.

Example 8 illustrates the maximum amount of the zinc borate flame retardant which is desirable. The oxygen index

TABLE I

| | Examples | | | | | | | | | |
|---|---|---|---|---|---|---|---|---|---|---|
| | 1 | 2 | 3 | 4 | 5 | 6 | 7 | 8 | 9 | A |
| EVA (28-400) | — | — | — | — | — | — | — | — | — | 25.5 |
| EVA (28-800) | 33.5 | 33.5 | 20.5 | 20.5 | 20.5 | 30 | 20 | 20 | 33.5 | — |
| EVA (28-2500) | — | — | 15 | 15 | 15 | 30 | — | 15 | — | — |
| Parapol ® 1300 polybutene | — | — | — | — | 3 | — | — | — | — | — |
| Escorez ® 2596 hydrocarbon resin | — | — | — | — | — | — | — | — | — | 26.5 |
| Escorez ® 5400 hydrocarbon resin | — | 7 | 3 | 3 | — | — | 10 | — | — | — |
| Paraflint ® H-4 synthetic HMP wax | 20 | 13 | 15 | 15 | 15 | 10 | 25 | 15 | — | 9 |
| Microcrystalline Wax 195° F. | — | — | — | — | — | — | — | — | 20 | 20.0 |
| Alumina Trihydrate 8 microns | — | — | — | — | — | — | — | — | — | 37.5 |
| Alumina Trihydrate 6 microns | — | — | — | — | 35 | — | — | — | — | — |
| Alumina Trihydrate 5 microns | 25 | 25 | 25 | 35 | — | 28.5 | 43.5 | 10 | 25 | — |
| Alumina Trihydrate 4 microns | — | — | 10 | 10 | — | — | — | — | — | — |
| Firebrake ZB zinc borate | 20 | 20 | 10 | — | 10 | — | — | 38.5 | 20 | — |
| Titanium Dioxide white pigment | 1 | 1 | 1 | 1 | 1 | 1 | 1 | 1 | 1 | 1 |
| Viscosity @ 135° C. | 11920 | 16520 | 12320 | 12100 | 10900 | 18240 | 2220 | 13340 | 19600 | 9540 |
| Viscosity @ 149° C. | 8300 | 11380 | 8280 | 8500 | 7480 | 12420 | 1550 | 9320 | 13480 | — |
| Oxygen Index | 25.5 | 24.5 | 25.5 | 26.5 | 25.0 | 23.5 | 27.0 | 24.5 | 25.5 | 25.5 |
| Smoke Number | 2 | 6 | 2 | 3 | 3 | 5 | 6 | 2 | 2 | 8 |
| Young's Modulus | 8230 | 3060 | 5520 | 4695 | 4065 | 1960 | 10210 | 5685 | 3910 | 3460 |
| Color (L value) | 93.81 | 94.70 | 93.61 | 93.63 | 93.92 | 95.39 | 94.26 | 95.70 | 95.14 | 92.98 |
| Color (B value) | 1.60 | 1.85 | 3.00 | 3.10 | 2.45 | 2.60 | 3.10 | 1.15 | 3.45 | 4.75 |

These compositions are light in color, very heat stable and low in viscosity.

Example 1 illustrates a composition which is mid-range for all ingredients and has no tackifying resin.

Example 2 illustrates a composition which has a relatively higher tackifing resin content than the other examples tested. The smoke generation is increased and is higher than what is preferable to the present invention but is still acceptable.

is slightly below that which is preferred in the present invention, although it is acceptable.

Example 9 is the same as Example 1 except that the synthetic high melting point wax (No. 1) has been replaced with the microcrystalline wax (No. 9). This simply illustrates the use of a different type of wax.

Comparative Example A illustrates a composition having a resin content which is too high resulting in a high smoke number, 8, indicating that the smoke generation is unacceptable for the present invention.

TABLE 2

Examples 10–14
(Heat Stabilities)

| Example | 10 | 11 | 12 | 13 | 14 |
|---|---|---|---|---|---|
| Elvax ® 200W | 15 | 15 | 15 | 20 | 12 |
| HMP Wax | 4 | 6 | 4 | 8 | 2 |
| Chlorez ® 700-SSNP | 20 | 20 | 20 | 10 | 25 |
| Tiona RCL-4 TiO$_2$ | 2 | 2 | 2 | 2 | 2 |
| A-208 Al Trihydrate | 57.5 | 55.5 | 37.5 | 58.5 | 56.5 |
| Hubercarb ® Q-325 (limestone filler) | — | — | 20 | — | — |
| Plasthall ESO (soybean oil) | 1 | 1 | 1 | 1 | 2 |
| 100 g Peel (° C.) | 52 | 57 | 54 | 39 | 66 |
| 500 g Shear (° C.) | 91 | 93 | 93 | 95 | 79 |
| Oxygen Index | 75 | 65 | 54 | 52 | 89 |
| Visc @ 135° C. (cPs) | 19,600 | 12,300 | 19,100 | 12,460 | 29,300 |
| Visc @ 149° C. (cPs) | 11,910 | 7,700 | 12,000 | 7,960 | 15,860 |
| Visc @ 149° C. (24 hrs) | 13,620 | 8,960 | 13,560 | 9,300 | 24,350 |
| Visc @ 149° C. (48 hrs) | 14,520 | 10,260 | 15,380 | 10,260 | 25,300 |
| (% increase in visc.) | (24%) | (33%) | (28%) | (29%) | (60%) |

Each example contains 0.5% by weight of the adhesive of Irganox® 1010, hindered phenolic antioxidant.

These compositions found in Table 3 having chlorinated paraffin exhibit higher oxygen indices than those compositions without and are highly flame retardant. These compositions may be useful for deep Class 2 filters and Class 1 filters. In contrast, those compositions found in Table 1 may be useful for Class 2 shallow and medium filters.

What is claimed is:

1. A High Efficiency Particulate Air Filter comprising:
   a) a material effective for filtering airborne contaminants; and
   b) a hot melt adhesive disposed on said material, said adhesive comprising
      i) from about 10% to about 60% by weight at least one copolymer of ethylene,
      ii) from about 10% to about 70% by weight hydrated inorganic flame retarding compound, and
      iii) from about 5% to about 35% by weight at least one high melting point wax, wherein said filter is pleated.

2. The filter of claim 1 wherein said adhesive is applied in a pattern selected from the group consisting of continuous and stitched.

3. The filter of claim 1 wherein said filter material is made of a fiber glass composite material.

4. The filter of claim 1 formed by a method comprising the steps of:
   a) applying said adhesive to said filtering material said filtering material being in a continuous strip and in an unpleated state; and
   b) pleating the filter material by folding it back and forth until it is in an accordion-like shape while said adhesive remains ductile.

5. The filter of claim 1 wherein said adhesive has a viscosity of less than about 30,000 cPs at about 150° C.

6. The filter of claim 1 wherein said at least one high melting point wax is selected from the group consisting of halogenated paraffin waxes, high melting point synthetic waxes, high melting point microcrystalline waxes mixtures thereof.

7. The filter of claim 1 wherein said adhesive further comprises from about 1% to about 10% by weight of at least one tackifying resin.

8. The filter of claim 1 wherein said hydrated inorganic flame retarding compound is selected from the group consisting of alumina trihydrate, magnesium hydroxide and mixtures thereof.

9. The filter of claim 1 wherein said adhesive further comprises up to about 40% by weight of the composition of zinc borate.

10. The filter of claim 1 wherein said at least one ethylene copolymer has a melt index of greater than about 400 grams per 10 minutes.

11. The filter of claim 1 wherein said adhesive has an oxygen index of greater than about 23.

12. The filter of claim 1 wherein said adhesive has a smoke number of less than about 5.

13. A High Efficiency Particulate Air Filter comprising:
   a) a material effective for filtering airborne contaminants; and
   b) a hot melt adhesive composition disposed on at least one surface of said material, said adhesive composition comprising
      i) from about 10% to about 60% by weight of at least one copolymer of ethylene having a melt index of greater than about 400 g/10 minutes,
      ii) from about 10% to about 70% by weight of at least one hydrated inorganic flame retarding compound, and
      iii) from about 5% to about 35% by weight of at least one wax component.

14. The filter of claim 13 wherein said adhesive further comprises from about 1% to about 10% of at least one tackifying resin.

15. The filter of claim 13 wherein said filter is in an accordion-like shape.

16. The filter of claim 13 wherein said at least one hydrated inorganic flame retardant compound is selected from the group consisting of alumina trihydrate, magnesium hydroxide and mixtures thereof.

17. A filter comprising:
   a) a material effective for filtering airborne contaminants; and
   b) a hot melt adhesive composition disposed on at least one surface of said material, said hot melt adhesive composition comprising
      i) from about 10% to about 60% by weight of at least one copolymer of ethylene,
      ii) from about 10% to about 70% by weight of at least one hydrated inorganic flame retarding compound, and iii) from about 5% to about 35% by weight of at least one wax component, wherein said hot melt adhesive composition has a viscosity of less than about 30,000 cPs at about 150° C.

18. The filter of claim 17 wherein said at least one ethylene copolymer is selected from the group consisting of ethylene vinyl acetate, ethylene n-butyl acrylate, ethylene methylacrylate, ethylene ethylacrylate, interpolymers of ethylene and at least one $C_3$ to $C_{20}$ α-olefin and mixtures thereof.

19. The filter of claim 17 wherein said at least one ethylene copolymer is ethylene vinyl acetate comprising from about 25% by weight to about 45% by weight vinyl acetate based on the total weight of the copolymer.

20. The filter of claim 17 wherein said filter is in an accordion-like shape.

21. The filter of claim 17 wherein said hot melt composition has a yellow-blue index from about 0 to about 5 and a black-white index from about 75 to about 100.

22. The filter of composition of claim 17 wherein said wax component is selected from the group consisting of halogenated waxes, high melting point synthetic waxes, high melting point microcrystalline waxes and mixtures thereof.

23. The filter of claim 17 said hydrated inorganic flame retardant compound is selected from the group consisting of alumina trihydrate, magnesium hydroxide and mixtures thereof.

24. The filter of claim 17 wherein said hot melt composition further comprises no greater than about 40% by weight of the composition of zinc borate.

25. The filter of claim 17 wherein said at least one ethylene copolymer has a melt index of greater than about 400 grams per 10 minutes.

26. The filter of claim 17 wherein said hot melt composition has an oxygen index of greater than about 23.

27. The filter of claim 17 wherein said hot melt composition has a smoke number of less than about 5.

* * * * *